United States Patent [19]

Butterworth

[11] 4,174,282
[45] Nov. 13, 1979

[54] LIQUID TREATMENT APPARATUS

[75] Inventor: Donald J. Butterworth, Stirling, N.J.

[73] Assignee: Ecodyne Corporation, Lincolnshire, Ill.

[21] Appl. No.: 943,403

[22] Filed: Sep. 18, 1978

[51] Int. Cl.² .................................................. B01D 29/16
[52] U.S. Cl. ............................. 210//232; 210/323 T; 285/321; 285/375
[58] Field of Search ................. 210/75, 193, 232, 236, 210/323 T, 448, 450, 451, 452; 285/267, 305, 307, 317, 320, 321, 361, 375, 396, 402

[56] References Cited

U.S. PATENT DOCUMENTS

| | | | |
|---|---|---|---|
| 2,714,021 | 7/1955 | Froidevaux | 285/375 |
| 3,279,608 | 10/1966 | Soriente et al. | 210/232 |
| 3,405,807 | 10/1968 | Burkhardt | 210/232 |
| 3,450,424 | 6/1969 | Calisher | 285/305 |
| 3,615,016 | 10/1971 | Soriente et al. | 210/232 |
| 3,637,240 | 1/1972 | Meier | 285/305 |
| 3,698,747 | 10/1972 | Wing et al. | 285/305 |
| 3,718,350 | 2/1973 | Klein | 285/321 |
| 3,779,386 | 12/1973 | Ryan | 210/323 T |
| 4,105,562 | 8/1978 | Kaplan et al. | 210/323 T |

FOREIGN PATENT DOCUMENTS

| | | | |
|---|---|---|---|
| 1428807 | 1/1966 | France | 285/305 |
| 1223050 | 2/1971 | United Kingdom | 285/305 |

*Primary Examiner*—Thomas G. Wyse
*Assistant Examiner*—Ivars Cintins
*Attorney, Agent, or Firm*—Charles M. Kaplan; Joel E. Siegel

[57] ABSTRACT

A liquid precoat filter has a multitude of elongated replaceable filter elements that have one of their ends supported on tubes that project upwardly from a tube sheet. The individual filter elements are releasably connected to the tubes by couplings that permit a spring clip to lock under shoulders when the filter element is pushed down; the spring clip is released when the filter element is rotated about one-quarter of a turn. A sliding seal prevents leakage between the filter elements and their support tubes.

10 Claims, 5 Drawing Figures

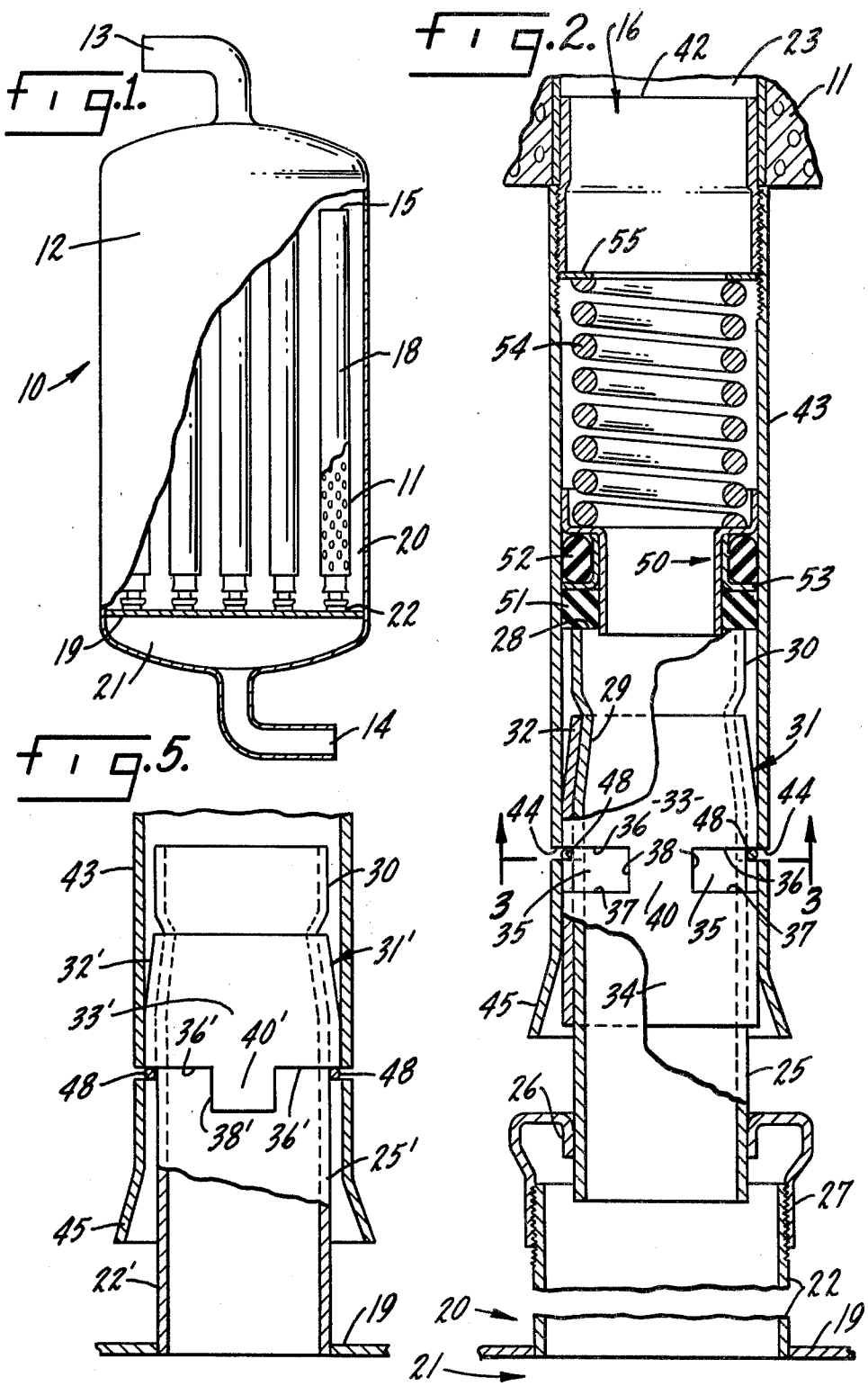

4,174,282

LIQUID TREATMENT APPARATUS

BACKGROUND OF THE INVENTION

This invention relates to the treatment of liquids, and more particularly to water filters that are precoated by replaceable powders.

Liquid filters that produce the ultra pure water required from steam generation of electricity are commonly precoated with diatomaceous earth or powdered ion exchange resins. Such filters may have five hundred or more individual filter elements that are each over six feet in length. Full utilization of the liquid treating capacity of the precoat materials requires that the precoat be uniformly applied over the full length of each filter element. When the steam used for electric power generation comes from a nuclear reactor, the filtering apparatus becomes highly radioactive, and the individual filter elements must be capable of being installed and removed from a remote location. During prolonged usage, the dimensions of the individual filter elements may change, as for example when a wound nylon filter element shrinks during high temperature service.

OBJECTIVES OF THE INVENTION

Accordingly, it is an object of this invention to provide improved liquid treatment apparatus.

Another object is to provide a liquid thereof filter having a uniform pressure drop throughout its length.

Another object is to provide a latching mechanism for liquid filter elements that will not loosen or permit leakage when the elements shrink or otherwise change their dimensions.

Another object is to provide a liquid filter tank with individual filter cartridges that can be installed and removed from outside of the tank.

Another object is to provide liquid filter cartridges that can be locked into operating position in a tank without having to be twisted.

Another object is to provide liquid filter elements that require less force to lock them in a tank, and less torque to release them.

Another object is to provide a liquid filter of reduced pressure drop having relatively long filter candles that are uniformly precoated throughout their length.

Another object is to reduce the amount of material required inside of a liquid treatment vessel that does not directly treat the liquid.

Another object is to provide high pressure liquid precoat filter elements with relatively inexpensive, durable, easily installed and maintained latching mechanisms that do not possess defects found in the prior art.

Other objects and advantages of the invention will be set forth in the specification and claims, and the scope of the invention will be found in the claims.

DESCRIPTION OF THE DRAWING

FIG. 1 is a schematic, partially broken-away, side view of a precoated liquid filter in accord with this invention.

FIG. 2 is an enlarged, partially cross-sectional, partially broken-away view showing the details of the latching mechanism for the filter elements in FIG. 1.

FIG. 5 is a fragmentary, partially broken-away partially cross-sectional view showing another embodiment of the invention.

DESCRIPTION OF THE INVENTION

Figures 3, 4:
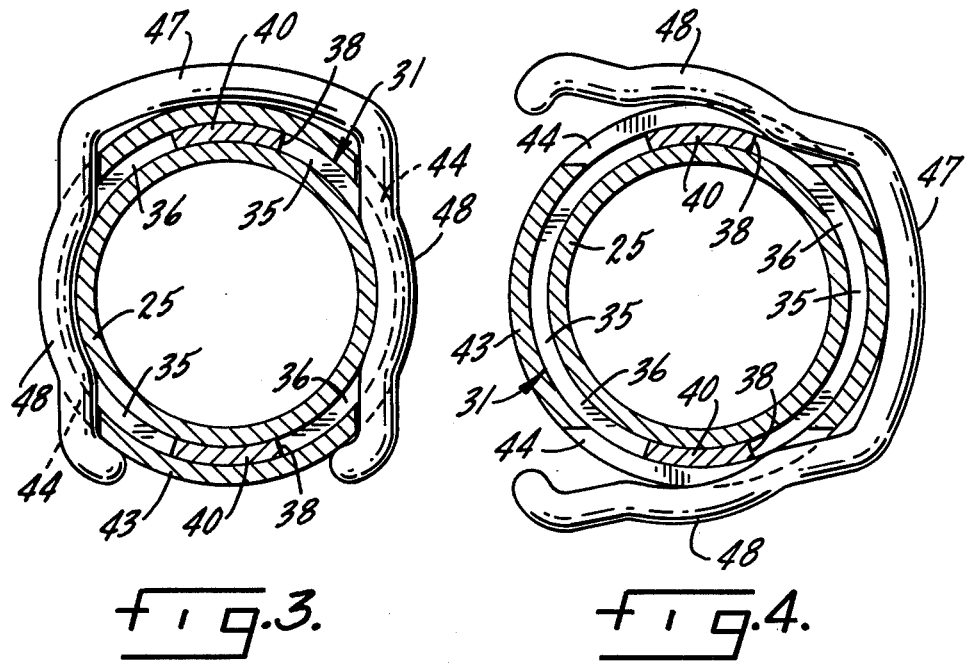
FIG. 3 is an enlarged cross-sectional view taken along the line 3—3 in FIG. 2, showing the latching mechanism in its locking position.
FIG. 4 is an enlarged cross-sectional view corresponding to FIG. 3, but showing the latching mechanism in its release position.

The drawing shows a liquid filter 10 in which a plurality of individual, elongated, cylindrical, porous filter elements 11 are enclosed in a pressurized vessel 12 having an untreated liquid inlet 13 and a treated liquid outlet 14. Filter elements 11 have closed upper ends 15 and open lower ends 16. Upper ends 15 may be supported in any known manner in vessel 12. Elements 11 may be made from commonly used materials, such as wound nylon or polyproylene threads or from stainless steel screens. Elements 11 may be precoated in conventional manner with a layer 18 of powdery material. A tube sheet 19 spans the lower portion of vessel 12 and divides the vessel into a relatively high pressure, untreated liquid chamber 20 communicating with inlet 13, and a relatively low pressure treated liquid chamber 21 communicating with outlet 14. A plurality of tubes 22 are welded or otherwise attached to sheet 19 in a fluid-tight manner. Tubes 22 project into chamber 20 and the inside of the tubes communicates with chamber 21 through tube sheet 19. Each filter element 11 is axially aligned with a tube 22, and the interior of each element 11 communicates with chamber 21 through its associated tubes. Liquid being treated enters chamber 20 through inlet 13, passes through the precoat layers 18 and the elements 11, and thus receives a predetermined treatment. The treated liquid passes through the cylindrical space 23 at the center of each element, through tubes 22 into chamber 21, and exits through outlet 14. Periodically, precoat layer 18 is backwashed from elements 11 and replaced with fresh material in conventional manner.

Means for releasably connecting each element 11 to its associated tube 22 is provided by a coupling including a generally cylindrical pipe 25 which has the outside surface of its lower end brazed or otherwise bonded in fluid-tight manner to the center circular rim 26 of a hollow cap 27. Internal threads in cap 27 are screwed on to mating threads on the upper end of tube 22. It is also possible to weld the lower end of pipe 25 directly to sheet 19, and thus eliminate tube 22 and cap 27. The opposite terminal end 28 of pipe 25 projects upwardly as a coaxial extension of tube 22, and the interior of pipe 25 communicates with the interior of the tube. A minor portion 29 of the pipe near end 28 tapers inwardly toward the axis of the pipe so as to define an enlargement 30 adjacent end 28. A generally cylindrical ring 31 tightly encircles pipe 25. Ring 31 may be swagged or welded on to the outside surface of pipe 25 so that these two elements are immovable relative to each other. The upper terminal end portion 32 of ring 31 which faces filter open end 16 overlays and conforms in shape to the outside surface of the tapered minor portion 29 of pipe 25 below enlargement 30, which prevents escape of ring 31 under upwardly directed forces. Ring 31 includes a first or upper ring segment 33 and a second or lower ring segment 34 which are separated by a pair of identical, opposed, spaced slots 35. One pair of corresponding edges of slots 35 facing tube 22 define a pair of shoulders 36 that extend partially around and project transversely from pipe 25 outwardly away from its axis. An opposite corresponding pair of edges of slots 35 define a pair of abutments 37 which face upwardly toward shoulders 36. A pair of opposed, identical integral portions 38 of ring 31 extend axially along pipe 25 between and beyond shoulders 36 toward tube 22 and connect segments 33 and 34. The outside surfaces of portions 38 provide ridges 40 extending along pipe 25 that are diametrically coextensive with the outside surface of ring 31, and the surface of the ridges is farther from the pipe axis than shoulders 36.

The releasable connector mechanism also includes an open-ended, central support cylinder 43. The upper end of cylinder 43 is rigidly attached to the open end 16 of the filter element by internal threads which mate with threads on a hollow adapter 42 that is secured to element 11. The interior of cylinder 43 communicates with the interior of element 11 through adapter 42. A pair of identical, transversely-aligned, relatively narrow slits 44 cut partially through opposite surfaces of cylinder 43 in a plane perpendicular to the axis of the cylinder. Cylinder 43 telescopes over and is coaxial with pipe 25. Cylinder 43 is movable with respect to pipe 25, and the pipe terminal end 28 faces the element open end 16 within cylinder 43. The bottom end of cylinder 43 is flared transversely outwardly at 45 to facilitate insertion over pipe 25 from a remote location.

A generally U-shaped spring clip 47 has opposed arms 48 biased toward each other. Clip 47 partially surrounds the outside of cylinder 43, and each arm 48 extends into and is retained by one of the slits 44. Arms 48 are normally separated by a distance that is less than the diametric distrance separating shoulders 36 on pipe 25. To connect filter element 11 to tube 22, cylinder 43 is telescoped over pipe 25 and pushed down until slits 44 are located closer to tube 22 than are the shoulders 36 on ring 31. As slits 44 move past shoulders 36 toward tube 22, the spring tension in clip 47 that urges arms 48 towards each other snaps arms 48 behind shoulders 36 into contact with shoulders 36 and with the outside surface of pipe 25 that is exposed through slots 35. This is the locking position of the connector assembly. To spread arms 48 to the release position in which element 11 can be disconnected from tube 22, element 11 is rotated about one-quarter of a turn (i.e. 90°). This causes arms 48 to ride up on to ridges 40, which spreads the arms a distance sufficient to enable them to ride over the outside of ring 31 and off pipe 25. Slots 35 are wider than slits 44 to facilitate locating both arms 48 below shoulders 36 if element 11 is tilted, and abutments 37 prevent end 45 of cylinder 43 from being pushed too far down pipe 25 into contact with cap 27.

A spring-biased sliding seal 50 in cylinder 43 prevents leakage from chamber 20 into chamber 21 between element 11 and tube 22. Seal 50 includes a rectangular O-ring gasket 51 that seals against end 28 of pipe 25, and a circular O-ring gasket 52 that seals between a slidable gasket retainer cage 53 and the inside of cylinder 43. A coil spring 54 is compressed between cage 53 and a washer 55 that contacts the bottom of adapter 42. Spring 54 provides sufficient force to hold gaskets 51 and 52 in sealing engagement and to hold arms 48 in tight contact with shoulders 36.

FIG. 5 shows another embodiment of the invention which is in all respects identical to the embodiment of FIGS. 1-4 except for the structure of ring 13', and for the manner of connection to tube sheet 19. Instead of being constructed from two segments, ring 31' has only one axially elongated ring segment 33'. A tapered upper terminal end portion 32' of segment 33' is located below enlargement 30 of pipe 25', and shoulders 36' are defined by the bottom terminal edges of ring 31'. A pair of identical diametrically opposed integral portions 38' of ring 31' have outer surfaces which define ridges 40' that extend beyond shoulders 36' toward tube 22'. The lower end 22' of pipe 25' is welded directly to tube sheet 19, and thus this lower end of pipe 25' serves the same function as tubes 22 in FIGS. 1-4 and is regarded as means defining a tube attached to sheet 19 and projecting into chamber 20. The remainder of pipe 25' is regarded as means defining a cylindrical pipe. The embodiment of FIG. 5 operates in the same way as that of FIGS. 1-4, except that there is no structure corresponding to abutments 37 for limiting downward movement of filter element 11, and cap 27 and tube 22 have been eliminated.

It has thus been shown that by the practice of this invention a filter element 11 can be locked in operating position by inserting cylinder 43 over pipe 25 and compressing its spring 54 by pressing downwardly on the top end 15 of the element until arms 48 snap inwardly behind shoulders 36 or 36'. Only relatively little torque is required to unlock an element 11 by twisting it about one-quarter of a turn until ridges 40 or 40' push arms 48 out to the level of the outside surface of ring 31 or 31'. These simple movements can be performed from the outside of vessel 12. The components used to connect and release elongated filter elements 11 to tubes 22 are outside of the length of the elements where filtering takes place, so such components do not cause the pressure drop to vary along the length of the elements.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims over all such changes as fall within the true spirit and scope of the invention.

What is claimed is:

1. A liquid filter comprising:
    A. a pressurized vessel having an untreated liquid inlet and a treated liquid outlet;
    B. a tube sheet spanning a portion of said vessel and defining an untreated liquid chamber communicating with said inlet and a treated liquid chamber communicating with said outlet;
    C. a plurality of generally cylindrical pipes connected to said tube sheet and projecting into said untreated liquid chamber, the inside of said pipes communicating with said treated liquid chamber through said tube sheet;
    D. a plurality of elongated porous filter elements, each having a closed end and an open end, each of said open ends being axially aligned with one of said pipes and communicating with said treated liquid chamber through its associated pipe;
    E. means for releasably connected each filter element to a pipe, comprising:
        1. means defining a pair of identical opposed shoulders extending partially around and projecting transversely from said pipe outwardly away from its axis, said shoulders facing toward said tube sheet, and means defining a pair of opposed identical ridges extending axially along said pipe between said shoulders toward said tube sheet, the outside surfaces of said ridges being farther from said axis than said shoulders;

2. an open-ended central support cylinder having one end rigidly attached to the open end of said filter element, the interior of said support cylinder communicating with the interior of said filter element, there being a pair of identical, transversely aligned slits cutting partially through opposite surfaces of said cylinder in a plane perpendicular to the axis of said cylinder, said cylinder telescoping over and being coaxial with said pipe, said cylinder being movable with respect to said pipe, and the terminal end of said pipe facing said open end of said filter element within said cylinder; and 3. a spring clip at least partially surrounding the outside of said cylinder, opposed portions of said clip being biased towards each other, each of said opposed portions extending into and being retained by one of said aligned slits, said opposed portions normally being separated by a distance less than the distance separating said shoulders on said pipe, and said pipe extending into said cylinder until said slits are located closer to said tube sheet than said shoulders, whereby said opposed portions are biased into a locking position connecting said filter element to said pipe when said opposed portions are in contact with said shoulders, and said opposed portions are spread to a release position for disconnecting said filter element and said pipe when said opposed portions are moved into contact with said ridges; and F. a spring-biased sliding seal in the central support cylinder of each filter element contacting said terminal edge of said pipe for preventing leakage from said untreated liquid chamber between said filter elements and pipes into said treated liquid chamber.

2. The invention defined in claim 1, wherein said means defining said pair of shoulders comprises a generally cylindrical ring tightly encircling and being imovably attached to the outside surface of said pipe, a pair of edges of said ring facing toward said tube providing said shoulders.

3. The invention defined in claim 2, wherein said means defining said ridges comprises integral portions of said ring extending beyond said edges toward said tube.

4. The invention defined in claim 2, wherein said ring comprises first and second ring segments separated by a pair of identical opposed spaced slots, one corresponding pair of the edges of said slots defining said shoulders and an opposite corresponding pair of the edges of said slots defining a pair of abutments which face toward said shoulders and limit movement of said spring clip toward said tube sheet.

5. The invention defined in claim 4, wherein said ridges are provided by integral portions of said ring connecting said ring segments.

6. The invention defined in claim 4, wherein said slots are wider than said slits in the direction of the axis of said filter element.

7. The invention defined in claim 2, wherein a minor portion of said pipe near said terminal end tapers inwardly toward the axis of said filter element so as to define an enlargement adjacent said terminal end, and the terminal end portion of said ring facing said filter open end overlays and conforms in shape to the outside surface of said minor portion below said enlargement.

8. The invention defined in claim 1, further comprising a tube attached to said tube sheet for each filter element, and each pipe being coupled to a tube by a hollow cap having a central circular rim bonded to the outside surface of said pipe, said cap having internal threads mating with threads on the end of said tube.

9. The invention defined in claim 1, wherein said spring clip is generally U-shaped, and said opposed portions of said clip are the arms of such U.

10. A liquid precoat filter comprising:
A. a pressurized vessel having an untreated liquid inlet and a treated liquid outlet;
B. a tube sheet spanning a portion of said vessel and defining an untreated liquid chamber communicating with said inlet and a treated liquid chamber communicating with said outlet;
C. means defining a plurality of tubes attached to said tube sheet and projecting into said untreated liquid chamber, the inside of said tubes communicating with said treated liquid chamber through said tube sheet;
D. a plurality of elongated porous filter elements, each having a closed end and an open end, each of said open ends being axially aligned with one of said tubes and communicating with said treated liquid chamber through its associated tube;
E. means for releasably connecting each filter element to a tube, comprising:
1. means defining a generally cylindrical pipe having one end coupled to said tube and its opposite terminal end projecting upwardly as a coaxial extension of said tube, the interior of said pipe communicating with the interior of said tube, a minor portion of said pipe near said terminal end tapering inwardly toward the pipe axis so as to define an enlargement adjacent said pipe terminal end;
2. a generally cylindrical ring tightly encircling and being immovably attached to the outside surface of said pipe, the terminal end portion of said ring which faces said filter open end overlaying and conforming in shape to the outside surface of said minor portion of said pipe behind said enlargement, a pair of identical opposed edges of said ring facing said tube and defining a pair of shoulders extending partially around and projecting transversely from said pipe outwardly away from its axis, a pair of opposed, identical, integral portions of said ring extending axially along said pipe between and beyond said shoulders toward said tube so as to provide ridges along said pipe diametrically coextensive with said ring, the outside surfaces of said ridges being farther from said axis than said shoulders;
3. an open-ended central support cylinder having one end rigidly attached to the open end of said filter element, the interior of said support cylinder communicating with the interior of said filter element, there being a pair of identical, transversely aligned slits cutting partially through opposite surfaces of said cylinder in a plane perpendicular to the axis of said cylinder, said cylinder telescoping over and being coaxial with said pipe, said cylinder being movable with respect to said pipe, and the terminal end of said pipe facing said open end of said filter element within said cylinder; and 4. a generally U-shaped spring clip having opposed arms biased towards each other and partially surrounding the outside of said cylinder, each of said arms extending into and being retained by one of said aligned slits, said arms normally being separated by a distance less than the distance separating said shoulders, and said pipe extending into said cylinder until said slits are located closer to said tube than said shoulders, whereby said arms are biased into a locking position connecting said filter element to said tube when said arms are in contact with said shoulders, and said arms are spread to a release position for disconnecting said filter element from said tube when said arms are moved into contact with said ridges by rotation of said filter element; and F. a spring-biased sliding seal in the central support cylinder of each filter element contacting said terminal edge of said pipe for preventing leakage from said untreated liquid chamber between said filter elements and tubes into said treated liquid chamber.

* * * * *

UNITED STATES PATENT AND TRADEMARK OFFICE
CERTIFICATE OF CORRECTION

PATENT NO. : 4,174,282
DATED : November 13, 1979
INVENTOR(S) : Donald J. Butterworth It is certified that error appears in the above—identified patent and that said Letters Patent are hereby corrected as shown below:

In column 1, line 29 delete "thereof" and insert --precoat--.

In column 3, line 65 delete "13' " and insert --31'--.
In column 4, line 40 delete "over" and insert --cover--.

Signed and Sealed this

Twenty-seventh Day of May 1980

[SEAL]

Attest:

SIDNEY A. DIAMOND

Attesting Officer

Commissioner of Patents and Trademarks